June 12, 1934.  H. ALBERTINE  1,962,419
MOTOR DRIVEN PUMP FOR GREASE OR THE LIKE
Filed July 14, 1930    2 Sheets-Sheet 1
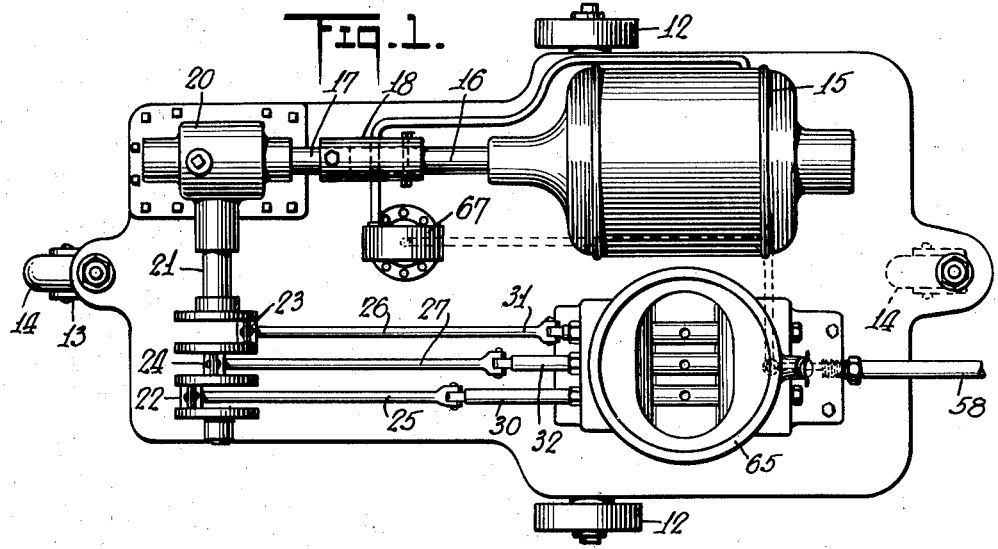
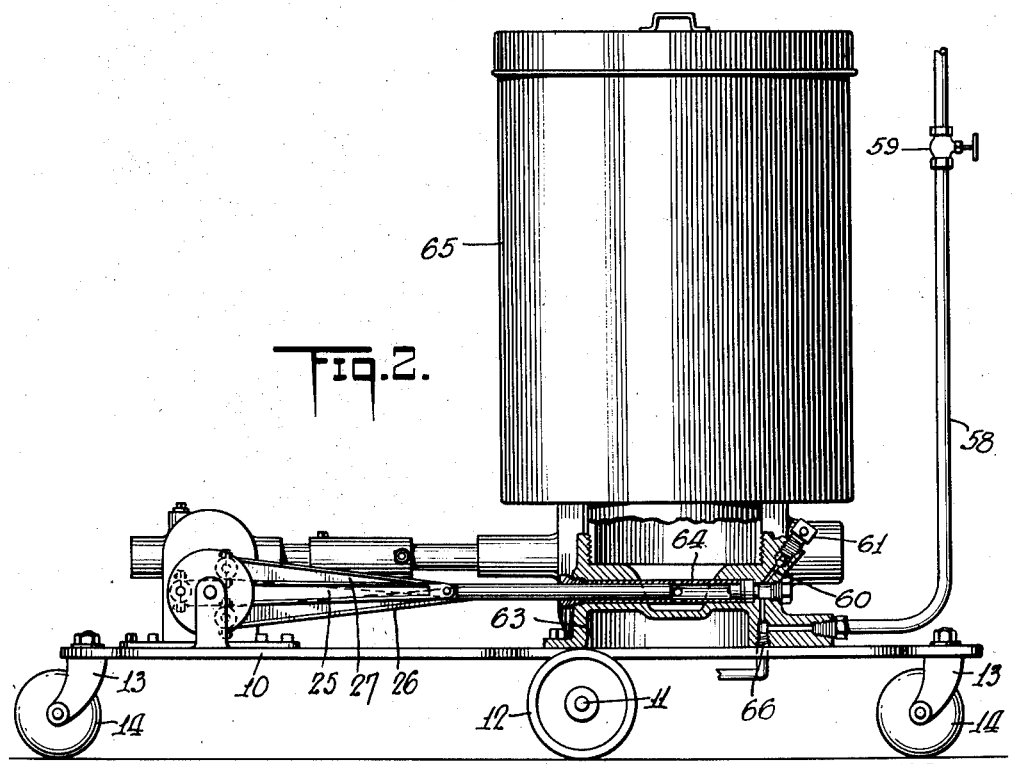
INVENTOR
Herman Albertine
BY
George C. Reeun
ATTORNEY June 12, 1934. H. ALBERTINE 1,962,419
MOTOR DRIVEN PUMP FOR GREASE OR THE LIKE
Filed July 14, 1930  2 Sheets-Sheet 2
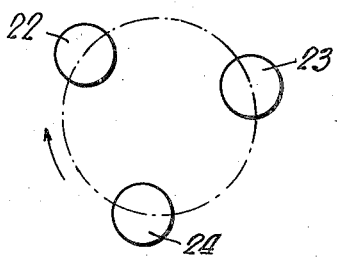
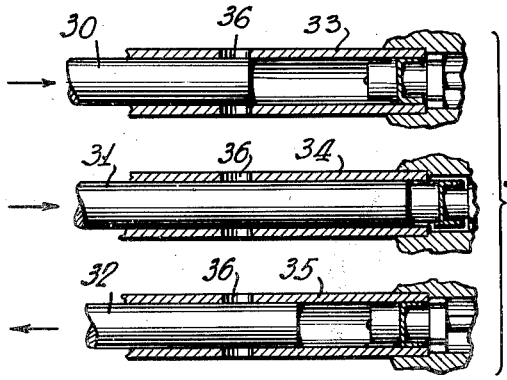
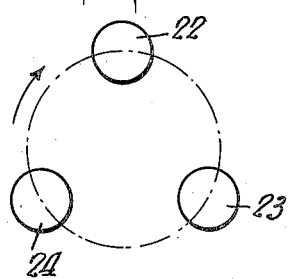
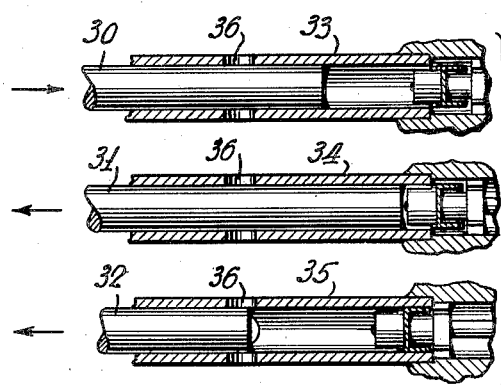
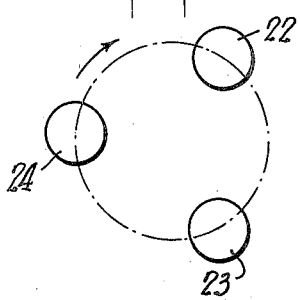
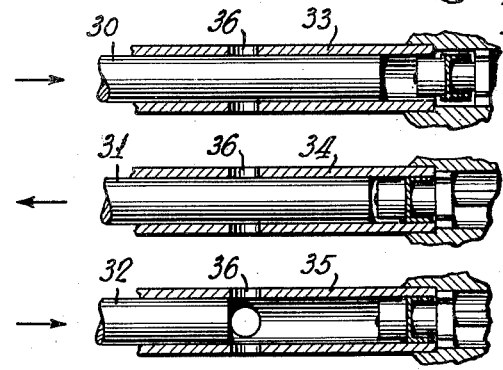
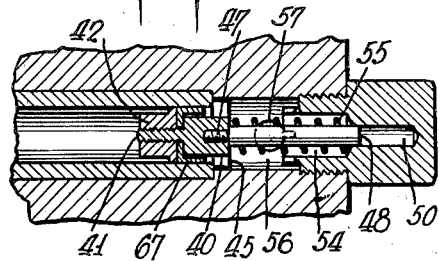
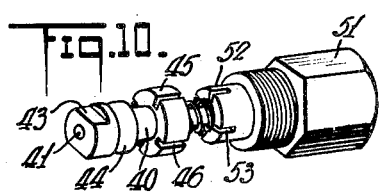
INVENTOR
*Herman Albertine*
BY
*George C. Adam*
ATTORNEY Patented June 12, 1934

1,962,419

UNITED STATES PATENT OFFICE 1,962,419

MOTOR DRIVEN PUMP FOR GREASE OR THE LIKE

Herman Albertine, Rutherford, N. J., assignor to Rogers Products Company, Inc., a corporation of New Jersey Application July 14, 1930, Serial No. 467,740

4 Claims. (Cl. 103—153)

My present invention is shown as embodied in a pump primarily designed for delivering grease at high pressure, usually through piping and couplers adapted to be detachably engaged with fittings of ducts of bearings, particularly on automobiles, trucks, etc., but it will be obvious that the invention and various features thereof may be used in connection with force-feed supply of other fluids.

The apparatus resembles that set forth in my prior application Ser. No. 330,802, filed January 27, 1929, as to some of its structural and control features and also in that it is capable of developing high pressures such as are required to force feed grease or the like against high resistance, as for instance, where an automobile fitting has been clogged with dirt or hardened lubricant.

One object of the invention is to employ a plurality of pump cylinders and pistons, preferably driven from the same crank shaft and each delivering through a check valve into a common chamber or header from which the grease is discharged into the high pressure piping, the reciprocations of the several pistons being in such phase relation that the high resistance, high compression part of each forcing stroke of each piston coincides with easy parts of the strokes of two other pistons.

One feature of the invention is an arrangement of each check-valve so that it will open not only automatically by pressure of grease forced against it by the piston, but also will be positively opened by the piston, regardless of pressure, near the end of the forward or forcing stroke, thereby adapting it to operate as an air pump to free the system from air which may be entrained in the grease. It will be readily understood that with the check valve held closed by high pressure in the header, incompressible fluids like grease will transmit the full power of the piston to the valve thereby opening it, whereas an elastic fluid like air can compress and expand idly with each movement of the piston, without ever building up pressure sufficient to open the valve; hence the value of having the automatic check valve functioning for pumping grease, combined with the positive opening for pumping air.

An important feature of my invention is that the required check valves are themselves pistons that slide a substantial distance into the pump cylinders before they reach the check point. The valve function is served by packing, preferably cup leather having the cup edge presented toward the pressure in the grease collecting header and the check function is served by positive check means entirely independent of the valve function. Hence they have none of the disadvantages of ordinary check valves in which the valve surface is the check surface and must perfectly fit a valve seat in order to prevent reverse leak of the grease during the retraction stroke of the piston. With my construction, there is no danger of the valve becoming leaky by reason of wear or bruising of the valve or its seat; or, more important, the presence of grit or dirt in the grease. The latter is a most frequent and troublesome cause of failure of grease pumps having outlet check valves.

A special advantage of these piston check valves is that they follow the retreat of the pump piston for a certain distance after closing, so that the pressure in the header is allowed to exert a rearward driving pressure on each piston during a substantial part of the retracting stroke of that piston. That is to say, while one piston is delivering grease into the header at high pressure, part of the volume of grease so delivered by it is operating as a motive fluid applying pressure through the valve to assist the retraction stroke of some other piston, thereby decreasing the peak load, that is, the maximum net total effort that must be exerted by the motor upon the three pistons in combination, as compared with the maximum effort that would otherwise be required of each piston.

In the preferred application of this principle, the pumping unit has three cylinders or a multiple thereof. In the case of a three cylinder unit, the three crank pins that operate the three pistons are arranged on a single crank shaft, 120° apart. When the crank is at right angles to its connecting rod or link, on the forward or forcing stroke of its piston, said piston is doing its maximum amount of work. While this plunger is in this position, a second piston associated with the crank 120° ahead of it has already begun its retrograde suction stroke. At this particular point, the valve unit associated with the second plunger will have been open from the previous compression stroke, and is returning into its normal check point, or seated position. The movement of this latter valve at that particular point in the cycle will be in the same direction as the movement of its piston and because of its own piston-like movement, said valve will apply the pressure of the grease behind it in the header, upon its pumping piston, so that during this part of its retracting said pumping piston is operating as a motor applying power to the crank shaft, during the peak load on the first piston, thereby reducing the peak load on the motor or other source of power, that drives the crank shaft.

The invention also consists in certain new and original features of construction and combinations of parts hereinafter set forth and claimed.

Although the novel features which are believed to be characteristic of this invention will be particularly pointed out in the appended claims, the invention itself, as to its objects and advantages, the mode of its operation and the manner of its organization may be better understood by referring to the following description taken in connection with the accompanying drawings forming a part thereof, in which Fig. 1 is a top plan view of the complete arrangement embodying the present invention;

Fig. 2 is a side elevation partly in section of a concrete embodiment of the present invention;

Fig. 3 is a diagrammatic sketch showing one position of the crank pins;

Fig. 4 is a section showing the position of the pumping plungers corresponding to the position of the crank pins of Fig. 3;

Fig. 5 is a diagrammatic sketch showing another position of the crank pins;

Fig. 6 is a section showing the position of the pumping plungers corresponding to the position of the crank pins shown in Fig. 5;

Fig. 7 is a diagrammatic sketch of still another position of the crank pins;

Fig. 8 is a section showing the position of the plungers in accordance with the position of the crank pins shown in Fig. 7;

Fig. 9 is a section showing details of the valve construction; and

Fig. 10 is a perspective showing details of the valve construction.

Like reference characters denote like parts in the several figures of the drawings.

In the following description and in the claims parts will be identified by specific names for convenience, but they are intended to be as generic in their application to similar parts as the art will permit.

In the accompanying drawings there is shown a specific embodiment of the present invention, as adapted to a portable pumping unit. This unit includes a platform 10 having the medial portion mounted on an axle 11, the ends of which carry suitably journaled wheels 12. Each end of the platform 10 carries a depending bifurcated bracket 13 which is swivelly mounted with respect to said platform and which has rotatably mounted between the prongs thereof a caster wheel 14. These wheels 14 are mounted above the floor level, but can be positioned in steering relationship by tilting either end of the platform about the axle 11 as a fulcrum.

Mounted on a platform 10 is a suitable source of power which may take the form of the motor 15, the shaft 16 of which is connected to a shaft 17 through the intermediacy of a flexible coupling 18. The end of this shaft 17 carries a worm (not shown) which is enclosed in a casing 20, and which meshes with a worm wheel (not shown) mounted on one end of the shaft 21. The other end of the shaft 21 carries a three-throw crank shaft arrangement having three crank pins 22, 23 and 24 spaced 120° apart. Each crank pin 22, 23 and 24 is connected to one end of each connecting rod 25, 26 and 27 respectively, the other end of which is knuckle-jointed to each of the pistons 30, 31 and 32 respectively. These plungers 30, 31 and 32 reciprocate in pumping cylinders 33, 34 and 35 which are provided with intake ports 36.

At the end of each cylinder is mounted a valve arrangement as shown in Figs. 9 and 10, the construction of which constitutes one of the main features of the invention. This valve arrangement includes a drum 40 having integral therewith an axial screw projection 41 which serves to hold the piston-like constituents of the valve unit. These piston-like attachments include a member 42, having a threaded engagement with said screw projection 41 and cooperating with a valve seat having a cylindrical surface. It is preferred to have part of each pumping cylinder serve as a valve seat and for that purpose the member 42 has a diameter which is substantially coextensive with the diameter of the cylinders. This member 42 is mutilated preferably on diametrically opposite sides thereof to provide chordal surfaces 43. Disposed between the drum 40 and the member 42 is a leather cup washer 44, having an outside diameter which is substantially equal to the inside diameter of the cylinders. Integral with the drum 40 is a collar 45 having radially extending slots 46 and serving as an abutment against the end of the cylinders. The drum 40 is provided with a tapped hole 47 for the reception therein of the reduced end of a guide rod 48. The other end of said guide rod reciprocates in a bore 50 of a plug 51 or other suitable closure member. This plug is screwed into a casing surrounding the cylinders, and has a reduced portion 52 provided with radial slots 53. The plug 51 is provided with an enlarged bore 54, in which is disposed one end of a coil spring 55, the other end of which cooperates with the collar 45. This coil spring 55 serves to urge the valve in a seated position as shown in Fig. 9.

The discharge chamber 56 of each pumping cylinder is provided with a discharge port 57, all of which are connected to a hose 58, having a valve 59 or a suitable automatic grease gun at the end thereof. A conduit 60 is provided leading into the common connection of the discharge chambers 56 and provided with a relief valve 61 to permit the escape of the air.

Surrounding each of the cylinders is a casting 63 which is provided with a trough 64 surrounding all of the cylinders, and which has a threaded engagement with a grease reservoir tank 65. This tank may be provided with suitable means for forcing the grease around the intake ports 36 of the cylinders.

Also leading into the common connection of the discharge chambers 56 is a conduit 66 having a connection to a pressure switch 67 which may take the form as disclosed in United States Patent 1,520,258. This pressure switch controls the operation of the motor 15, and is adapted to maintain a constant pressure in the grease lines by automatically shutting down the motor when a predetermined pressure has been attained, and starting the motor as soon as the pressure has fallen below this predetermined pressure.

In the operation of the machine when the crank pins are relatively positioned as shown in Fig. 3, the plunger 30 has just covered its intake port 36 and is beginning to apply pressure on the grease in the cylinder, but its outlet valve has not yet begun to open. At this point in the cycle, piston 31 is just completing its pressure stroke, and the piston 32 is on its retrograde movement with its valve already seated into normal position.

In Fig. 5, the crank pin 22 has moved into the uppermost position of the cycle of rotation. In that position, its associated piston 30 is at or near its maximum speed of forward movement and its greatest amount of work. While the crank pin 22 is in this position, the crank pin 23 has passed its dead center of forward movement and is in the position shown in Fig. 5 so that its associated piston 31 has already begun its retrograde movement and its clutch valve is beginning its spring pressed return movement. During this period and continuing until the valve reaches check position, the full pressure of the grease is exerting motive pressure on piston 31. Thus during this period of the cycle, piston 31 is relieving the peak load that is being imposed on motor 15 by the maximum working operation of the piston 30.

In Fig. 7, the crank pins are shown in a further advanced position, the crank pin 22 having passed its peak load. The piston 31 has already moved a sufficient distance to permit its valve to seat as shown in Fig. 8, and said piston 31 is beginning to draw a vacuum in its cylinder 34; while the piston 32 has just finished its suction stroke and is beginning to return for a pressure stroke.

It should be noted that as the valve reciprocates in response to the pressure variations created in the cylinders, the cup valve 44 acting in a piston-like manner, cooperates with its cylindrically surfaced valve seat and wipes off the grease and grit attached to the inside surface of said seat. This obviates the possibility of said valve being stuck or failing to seat because of foreign material between said valve and the end of the cylinder.

It should also be noted that the valve extends sufficiently in the interior of the cylinder so that in case air is entrapped in the cylinders during the compression stroke, and the spring is sufficiently strong to prevent the opening of the valve in response to the pressure created in said cylinder, said piston at the end of each stroke will come in contact with said valve and positively open it, thereby releasing the air.

It should be further noted that while the valve is open, the collar 45 may be disposed in abutting relationship with the member 52, so that the pressure of the grease in the discharge chamber 56 might not have a chance to act on the plane surface of said collar to urge it back into seating position. For that purpose the slots 46 have been provided to permit the passage of the grease between said slots, around the periphery of the collar 52, into the slots 53 and upon the plane surface of said collar 45, thereby subjecting said collar to sufficient pressure to urge it back into normal closed position. It should also be observed that by making the member 52 smaller than the diameter of the discharge chamber 56, the grease has a chance to travel through the slots 46, around the periphery of the member 52 and through the discharge port 57. The slots 46 on the collar 45 also serve to permit the escape therethrough of the grease lodged between said collar and the end of the pumping cylinder when the valve is moving toward a seated position.

It should be still further noted that the valve may be made accessible for cleaning by merely removing the plug 51 and pulling out the valve unit.

It should be observed that in the extreme open position of the valve, portion of the member 42 will still be disposed in the cylinder. The cylindrical portion of said member acts as a guide for said valve and the mutilated portion thereof permits the grease in this open position to escape from the end of the cylinder.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

I claim:—

1. An apparatus for pumping grease including a pumping cylinder, a plunger mounted for reciprocal movement therein, a cylindrical surfaced valve seat at the discharge end of said cylinder and coaxial with said cylinder, and a valve unit disposed at the discharge end of said cylinder, and having a piston element sliding in said valve seat said piston element being provided with a cup leather the free edge of which is directed away from the grease pressure applied by the pump plunger.

2. An apparatus for pumping grease, including a pumping cylinder, portion of the interior cylindrical surface thereof serving as a valve seat, a plunger mounted for reciprocal movement in said cylinder, and a valve unit including a piston provided with a cup leather engaging and sliding in said valve seating portion of said cylinder the free edge of said cup leather being directed toward the outlet end of said pump cylinder.

3. An apparatus for pumping grease, including a pumping cylinder, a plunger mounted for reciprocal movement therein, a cylindrically surfaced valve seat at the discharge end of said cylinder, a spring actuated valve unit disposed at the discharge end of said cylinder, and having a piston valve cooperating with said valve seat, said valve unit also having a collar abutting against a stationary surface of the apparatus when said valve is in a closed position, said collar having conduits to permit the escape therethrough of grease lodged between said collar and said stationary surface when the valve unit is moving towards a seated position.

4. An apparatus for pumping grease, including a pumping cylinder, a plunger mounted for reciprocal movement therein, a cylindrically surfaced valve seat at the discharge end of said cylinder, a spring actuated valve unit disposed at the discharge end of said cylinder, and having a piston valve cooperating with said valve seat, said valve unit also having a guide rod secured thereto, a discharge chamber, and a closure member for said discharge chamber, said closure member having a bore adapted to receive said guide rod.

HERMAN ALBERTINE.